2 Sheets—Sheet 1.
I. H. STODDARD.
Photographic Camera.
No. 231,506. Patented Aug. 24, 1880.
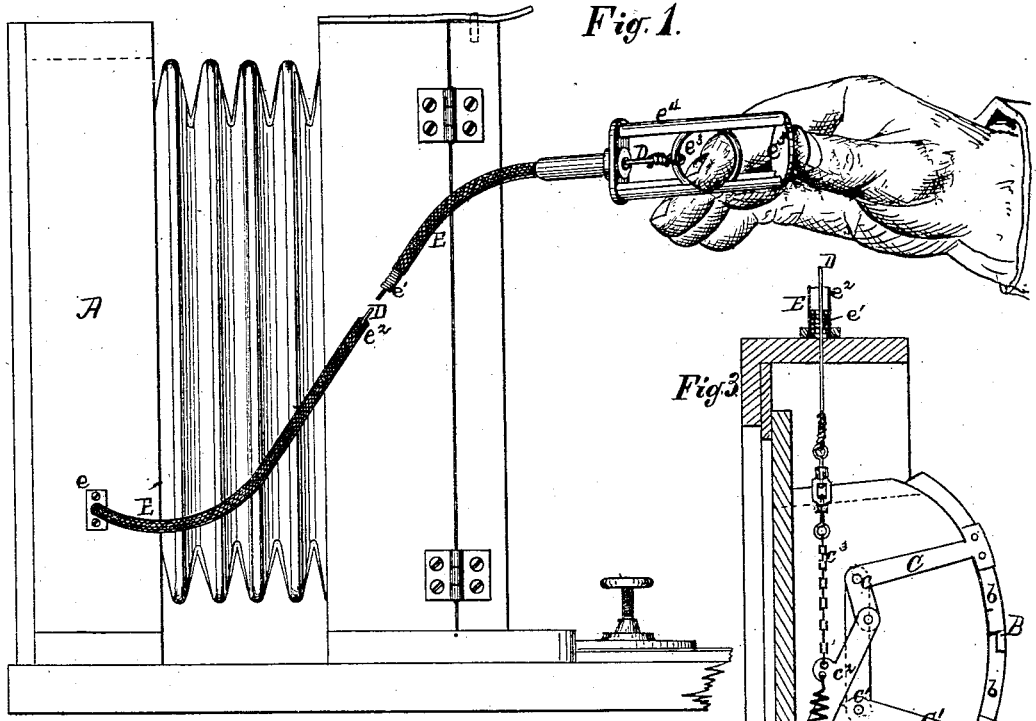
Fig. 1.
Fig. 3.
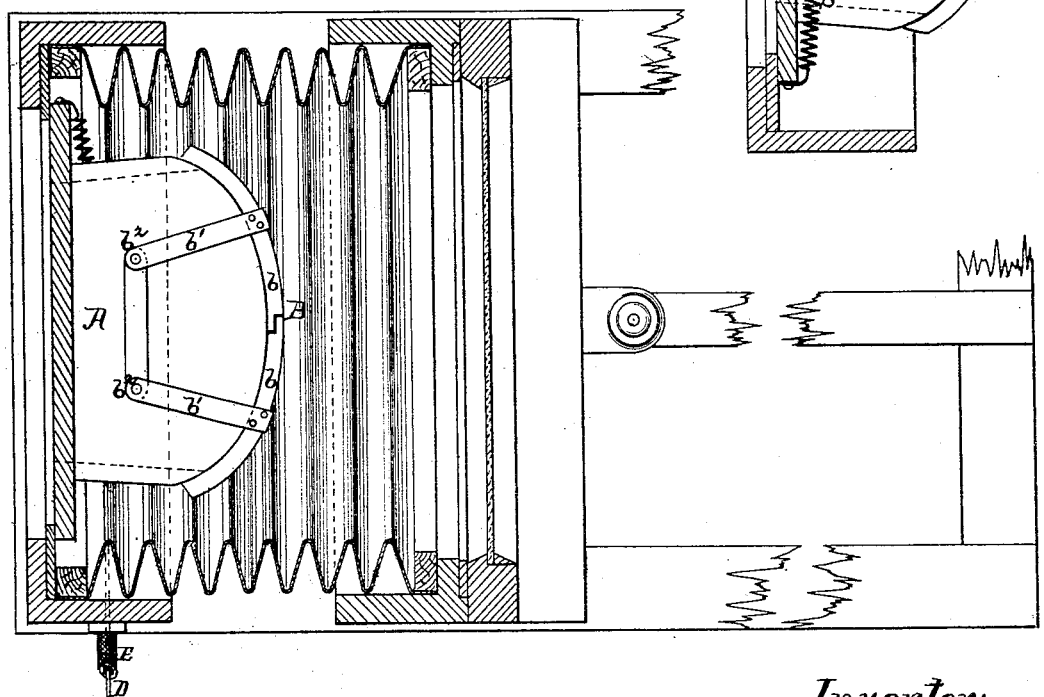
Fig. 2.
Witnesses:
A. S. Fitch
Henry Eichling
Inventor:
Isaac H. Stoddard
By A. S. Fitch, atty.

2 Sheets—Sheet 2.

I. H. STODDARD.
Photographic Camera.

No. 231,506. Patented Aug. 24, 1880.

Witnesses
A. S. Fitch.
Henry Eichling

Inventor:
Isaac H. Stoddard
By. S. Fitch
Atty.

UNITED STATES PATENT OFFICE.

ISAAC H. STODDARD, OF ANSONIA, CONNECTICUT, ASSIGNOR TO E. & H. T. ANTHONY & CO.

PHOTOGRAPHIC CAMERA.

SPECIFICATION forming part of Letters Patent No. 231,506, dated August 24, 1880.

Application filed November 29, 1879.

*To all whom it may concern:*

Be it known that I, ISAAC H. STODDARD, of Ansonia, New Haven county, State of Connecticut, am the inventor of certain Improvements in Photographic Cameras, of which the following is a full, clear, and exact description, reference being had to the accompanying drawings, forming part of this specification.

My invention relates to a photographic camera, and more particularly to devices whereby the operator may conveniently open and close the shutter without jarring or disturbing the position of the camera, as hereinafter particularly set forth, and more at length recited in the claims.

Figure 4:
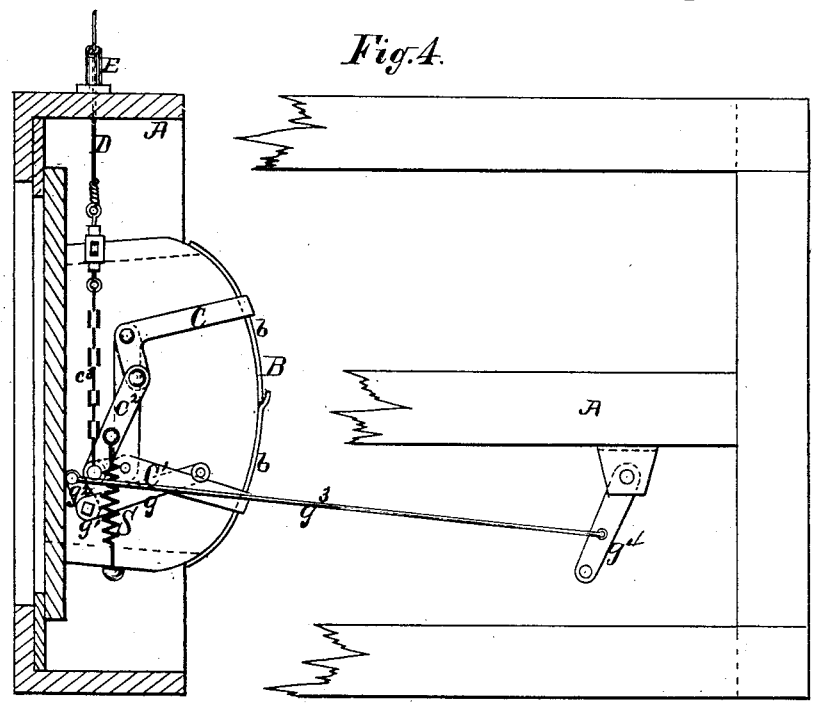
Figure 5:
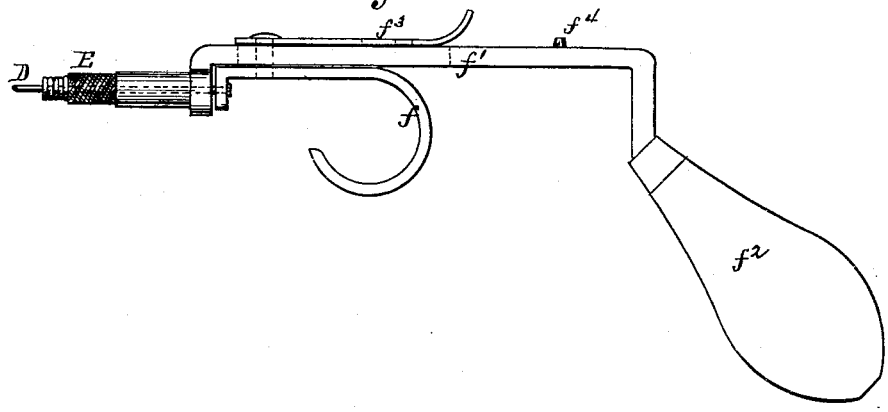

Figure 1 is a side elevation of a camera embodying my improvements, and showing one form of a hand-piece which may be employed in connection with my other devices for opening and closing the shutter. Fig. 2 is a plan, partly in section, of the camera shown in Fig. 1, and disclosing the shutter. Fig. 3 is a sectional inverted view of the front end of the camera, showing the shutter and its operating devices. Fig. 4 is a similar view of the same, and showing another form of device for opening and closing the shutter; and Fig. 5 is a side elevation of a modification of the hand-piece or pull for operating the shutter.

Similar letters of reference indicate similar parts.

A is the camera frame or body. At B is shown the shutter, which is preferably made in two sections, $b\,b$, that meet at their adjacent edges to close the opening into the camera through which the light enters. The sections are sustained in place by means of arms $b'\,b'$, preferably secured to the sections at the upper edges thereof, and pivoted at $b^2$, so as to permit the sections to swing away from or toward each other, and thus open or close the said opening and admit or exclude the light.

C and C' are bell-crank levers pivoted to the frame at $c$ and $c'$, and with the long arm of each attached to one of the sections of the shutter, preferably at the lower edge of the sections, as shown. A connecting rod or link, $c^2$, unites the short arms of said levers, and a coil-spring, S, preferably attached to said link, is so arranged that its recoil will swing the long arms of the levers, and consequently the shutters, toward each other and hold the shutter closed. The rod or link $c^2$ is connected to the wire D, and such connection is preferably made by means of the chain $c^3$ or other suitable flexible device. The said wire D passes to the exterior of the camera, where its free end can be conveniently manipulated by the operator.

It is evident that by pulling upon the said wire the levers C C' will be swung so as to open the section of the shutter, and that upon releasing the wire the recoil of the spring S will act to close the shutter; but it is evident that in opening a swinging shutter in a camera by pulling upon a cord or wire actuating the shutter the pull upon the cord or wire is exceedingly liable to disturb the position or set of the camera. To obviate this difficulty I employ devices by means of which a pressure or force may be exerted upon the frame or body of the camera equal to the strain or force of the pull upon the wire actuating the shutter, so that any force felt by the camera from the pull upon the wire, and thus tending to jar the camera, is neutralized. The wire D is passed through a tube, E, one end of which is secured to the camera body or frame, as at $e$, and as it is desirable that this said tube should be flexible I prefer to form the tube of a wire wound into a close helix, as shown at $e'$, Fig. 1, and I find it desirable to place upon the helix thus formed a jacket of some textile fabric, as shown at $e^2$.

It is evident that when the wire D is pulled to open the shutter, if an equal force is exerted in the opposite direction upon the tube E, any force felt by the camera-frame by the pull on the wire will be neutralized by the force exerted on the said frame through the tube, and the jarring of the camera will be avoided.

In Fig. 1 is shown one form of hand-piece by which the operator can conveniently utilize the wire D and tube E. Upon the end of the wire is fixed a ring, $e^3$, which is arranged conveniently for the finger of the operator, as shown, while a frame, $e^4$, fixed to the end of the tube E, supports a plate, $e^5$, arranged conveniently to be pressed upon by the thumb of the operator.

In Fig. 5 is shown a modified hand-piece, which may be employed when it is desired to hold the shutter open for any length of time while the force exerted by the operator has ceased. In this hand-piece a finger-piece, $f$, is attached to the end of the wire D and moves in a slot in a plate, $f'$, secured to the tube, said plate $f'$ terminating in a handle, $f^2$, adapted to be grasped by the hand, while the finger-piece $f$ is provided with a spring-catch, $f^3$, arranged to engage a stop, $f^4$, on the plate $f'$. To release the wire D it is only necessary for the operator to press with his thumb upon the upwardly-turned end of the spring-catch.

At $g$, Fig. 4, is a lever fixed to a post or shaft, $g'$, having bearings in the camera-frame, the free end of said lever engaging the long arm of the bell-crank lever C'. A crank-arm, $g^2$, on said post is connected by a rod, $g^3$, with the actuating-lever $g^4$, which may be conveniently pivoted to the camera-frame, as shown. By means of these devices the levers C C' may be operated to open the shutter, and if the lever $g^4$ is swung back, so that the rod $g^3$ passes the fulcrum-point of said lever, to hold said shutters open. When the lever $g^4$ is released the spring S acts to close the shutter. These devices may be employed when it is not deemed necessary or desirable to use the wire-pull D, and it is evident that, the connection made between the link $c^2$ and the wire D being flexible, as heretofore described, these devices, when placed upon the camera with the wire-pulls D, will not interfere with or embarrass the operation of the said pull.

I have described what I regard as the preferable form and construction and actuating devices intermediate to the shutter and the wire or cord used to open the shutter; but I do not intend to limit myself to the special form of construction of shutter, and said devices described and shown, and so far as relates to the combination, with the camera and shutter, of the tube E and wire or cord D, any known form and arrangement of shutter may be employed adapted to be opened by a cord or wire when pulled by the operator, and any suitable devices intermediate to the shutter and wire or cord may be used, or such intermediate devices may be dispensed with altogether, and the wire or cord may be connected immediately to the shutter, a suitable spring for closing the shutter being then properly applied to accomplish that purpose.

Either of the forms of the hand-piece that I have described may be used, or any equivalent form, whereby, when connected with the wire D and tube E and grasped in the hand, the wire may be conveniently pulled, and at the same time force in the opposite direction may be exerted upon the tube.

What I claim as my invention, and desire to secure by Letters Patent, is—

1. In a photographic camera, the combination, with the shutter and the camera-body, of the flexible wire or cord D within the flexible tube E, substantially as described, to operate as and for the purpose specified.

2. In a photographic camera, the combination, with the shutter, the camera-body, and the wire or cord D and its tube E, of a hand-piece, substantially as described and shown, whereby the wire may be conveniently pulled, and at the same time force may be exerted in the opposite direction upon the tube by the operator's hand, as and for the purpose specified.

3. In a photographic camera, the combination, with the levers C and C' of the shutter and their link $c^2$, of the lever $g$, shaft $g'$, arm $g^2$, rod $g^3$, and actuating-lever $g^4$, as and for the purpose specified.

ISAAC H. STODDARD.

Witnesses:
EGBERT BARTLETT,
VERRERINE MUNGER.